(12) United States Patent
Petursson et al.

(10) Patent No.: US 10,154,656 B2
(45) Date of Patent: Dec. 18, 2018

(54) OPTICAL SYSTEM FOR COUNTING OBJECTS

(71) Applicant: VAKI FISKELDISKERFI HF, Kopavogur (IS)

(72) Inventors: Thorvaldur Logi Petursson, Reykjavik (IS); Sverrir Hakonarson, Reykjavik (IS)

(73) Assignee: Vaki Fiskeldiskerfi HF, Kopavogur (IS)

(*) Notice: Subject to any disclaimer, the term of this patent is extended or adjusted under 35 U.S.C. 154(b) by 119 days.

(21) Appl. No.: 15/310,333

(22) PCT Filed: May 12, 2015

(86) PCT No.: PCT/IS2015/050008
§ 371 (c)(1),
(2) Date: Nov. 10, 2016

(87) PCT Pub. No.: WO2015/173838
PCT Pub. Date: Nov. 19, 2015

(65) Prior Publication Data
US 2017/0231203 A1   Aug. 17, 2017

(30) Foreign Application Priority Data
May 12, 2014   (IS) ................................ 9047

(51) Int. Cl.
*A01K 61/95*   (2017.01)
*G01V 8/10*   (2006.01)

(52) U.S. Cl.
CPC ................ *A01K 61/95* (2017.01); *G01V 8/10* (2013.01)

(58) Field of Classification Search
CPC ........... A01K 61/95; A01K 61/90; G01V 8/10
See application file for complete search history.

(56) References Cited

U.S. PATENT DOCUMENTS

| 8,651,057 B1 | 2/2014 | Welsh |
| 2008/0265141 A1 | 10/2008 | Leuenberger et al. |
| 2011/0114029 A1 | 5/2011 | Chu |

FOREIGN PATENT DOCUMENTS

| CA | 1336276 C | 7/1995 |
| WO | 91/03029 A1 | 3/1991 |

OTHER PUBLICATIONS

International Search Report and Written Opinion for PCT/IS2015/050008; dated Sep. 15, 2015; 11 pages.

*Primary Examiner* — Tri T Ton
(74) *Attorney, Agent, or Firm* — Quarles & Brady LLP

(57) ABSTRACT

The invention comprises a system and an optical device (1) to facilitate the counting of objects, e.g. fish and other organisms living in freshwater or sea, especially when using large-scale equipment in fish-fanning. The system makes it possible to diminish the distance between the recording camera and the objects to be counted.

15 Claims, 3 Drawing Sheets

OPTICAL SYSTEM FOR COUNTING OBJECTS

FILED OF THE INVENTION

The invention relates to a system and an optical device to facilitate the counting of objects, e.g. fish and other waterborne organisms, in large-scale equipment used especially in fish-farming. The system comprises a camera, a light source and an array of mirrors that makes it possible to diminish the distance between the recording camera and the objects to be counted.

BACKGROUND OF THE INVENTION

In the fish-farming industry a common practice while transferring organisms between receptacles is to make an estimation of the number and size of organisms being transferred. Various methods are used to count the organisms. As an example NO168151 (Kvassheim) discloses a method and device for the recording of number of objects, particularly live fish, were a CCD-line camera is used to count organisms on the basis of their area. NO332233 (Wingan) also discloses a fish counter where two cameras are positioned perpendicular to each other. None of these documents disclose a solution similar to the one described herein.

It is a commonly used technique when counting live fish in counting equipment for fish to position a camera between the stream of fish and a light source. The organisms then generate silhouettes that the camera registers. The signals from the camera are processed in a computer that turns the data into information on the number of organisms by using a specific algorithm.

When scaling up the size of equipment used in fish-farming industries for sorting and counting organisms it is a disadvantage that the distance of the camera from the light source, as described above, has to be enlarged in order for the camera to get a sufficient field of vision. The larger the equipment gets, the bigger the distance has to be.

SUMMARY OF THE INVENTION

As stated above, scaling up of devices for sorting and counting organisms in fish-farming industries using imaging devices has the disadvantage of increased distance of the camera from the light source, which demands more space and can result in less accurate counting. The object of the present invention is to overcome this disadvantage by a special optical device disclosed herein and a system for its use.

The invention relates to a system and an optical device to facilitate the counting of objects, e.g. fish and other waterborne organisms, in large-scale equipment used especially in fish-farming. The system comprises a camera, a light source and an array of mirrors that makes it possible to diminish the distance between the recording camera and the objects to be counted.

It is an object of the present invention to overcome or ameliorate the aforementioned drawbacks of the prior art and to provide an improved and/or alternative and/or additional method or device for counting fish and marine organisms. It is one preferred object of the present invention to provide a device with optical device and a light source in order to further improve the failsafe and accurate operation, with increased capacity with reduced space demands. Moreover, it is a preferred object of the present invention to provide a device comprising a camera and a minimum of two mirrors which direct the camera field of vision towards the light source that generates the silhouettes being analyzed. Another preferred object of the present invention is to provide a device with an improved special construction of mirrors in the device which generates a line of sight that consists of multiple reflections with a certain angle. It is also a preferred object of the present invention to provide a device with an improved operability and/or an increased ease of use during operation and set up of the device. Preferably, only minor changes to the routine of the personnel are necessary. Also, it is one preferred object of the present invention to avoid long setup times.

The object(s) underlying the present invention is (are) particularly solved by the features defined in the independent claims. The dependent claims relate to preferred embodiments of the present invention. Further additional and/or alternative aspects are discussed below.

It is the combination of a) using a set of mirrors to shorten the distance from the camera to the lane carrying the flow of living organisms and b) the broadened surface below the camera, which provides the improved method and device resulting in more capacity of determining numbers or density of flow of living organisms in a fluid. Not only does the invention provide more capacity in counting or density measurements of living organisms in a flow, but it also provides a more compact device as the distance from the camera to the in-feed channel can be reduced dramatically resulting in less space needed. The distance of the camera from the in-feed channel needs to be larger when a broader working width is covered and some facilities do not allow such a distance. Furthermore, the combination of computer vision, the use of mirrors to reflect the light from the in-feed lane, and the broadened transparent area of the in-feed lane to determine numbers or density of flow of living organisms in a fluid provides a more practical solution to previous limitations in this field.

Thus, at least one of the preferred objects of the present invention is solved by an apparatus for determining density or number of living organisms. Preferably the apparatus comprises a channel for a flow of living organism, an outlet portion and a computer. The channel comprises a flattened portion or lane made from transparent material and. Moreover, the apparatus preferably comprises a light source for projecting light through a stream of living organisms, where the light source is positioned below the flattened portion or lane. The apparatus further comprises an optical device positioned above and directed towards the flattened portion or lane of the channel, said optical device is positioned behind at least two mirrors, which reflect the light from the flattened channel or lane. Furthermore, the computer determines the density or amount of living organism in a flow based on the amount of light reflected detected by the optical device. Preferably the invention is based on using a minimum of one pair of mirrors.

In the present context, the ratio of the distance between the at least two parallel mirrors and the total length of the field of vision, decreasing the distance of the field of vision outside the box, has to be an even multiplier. This can be specified in the formula:

$$L = N*l + e_1 + e_2$$

where L is the total length and field of sight, N is an even multiplier (2, 4, 6, ... ), l is the distance between the parallel mirrors, $e_1$ is the distance from camera lens to the first parallel mirror and $e_2$ is the distance from the last mirror reflection to the light source.

In the present context, the computer is used in combination with the camera and the software to record silhouette images of the objects passing by the light source, where an algorithm is used to recognize, filter and count the number of objects as they flow by.

Another preferred object of the present invention is solved by a method for determining density or number of living organisms in a flow, said method comprising the steps of feeding a flow of living organism on a channel, the channel comprising a flattened channel or lane made from transparent material. Preferably, the method comprises the step of using a light source for projecting light through a stream of living organisms, said light source is positioned below the flattened channel or lane and then feeding the flow of living organism trough an outlet portion. The method further comprises the step of using an optical device, positioned behind at least two mirrors, to reflect the light from the flattened channel or lane. The optical device is positioned above and directed towards the flattened channel or lane said optical device is. Furthermore, the computer determines the amount of living organism in the flow based on the amount of light reflected detected by the optical device.

Another preferred object of the present invention is solved by a fish farm comprising an apparatus for determining density or number of living organisms in a flow. Preferably the apparatus comprises a channel for a flow of living organism, an outlet portion and a computer. The channel comprises a flattened portion or lane made from transparent material and. Moreover, the apparatus preferably comprises a light source for projecting light through a stream of living organisms, where the light source is positioned below the flattened portion or lane. The apparatus further comprises an optical device positioned above and directed towards the flattened portion or lane of the channel, said optical device is positioned behind at least two mirrors, which reflect the light from the flattened channel or lane. Furthermore, the computer determines the density or amount of living organism in a flow based on the amount of light reflected detected by the optical device.

In an embodiment of the present invention, the optical device is a camera. In a specific embodiment of the present invention, the optical device is a line-scan camera.

It is preferred to use a line scan camera but other kinds of cameras could also be used, such as frame cameras with the ability to extract single lines with a certain sampling rate to build a time series that generate a continuous image.

It is preferred to use first-contact mirrors in the device to overcome the attenuation and ghost shadows occurring using regular mirrors which have a layer of glass on top of the reflective surface. First contact mirrors have the reflective surface on the top of the surface and thus the light does not have to travel through a layer of glass before being reflected. The invention is not limited to the used of first-contact mirrors as regular mirrors or other kinds of mirrors may also be used.

In an embodiment of the present invention the at least two mirrors are first-contact mirrors.

In an embodiment of the present invention the flattened portion or lane of the channel made from transparent material has an open upper surface.

In an embodiment of the present invention the flattened portion or lane of the in-feed channel made from transparent material has a broadened lower surface than the remaining part of the in-feed channel.

In an embodiment of the present invention, one or more of the channel for a flow of organisms, the light source, the optical device and the outlet are positioned within a housing.

In a specific embodiment of the present invention the light source and/or the optical device are positioned within a separate housing below and above the channel for a flow of organisms respectively.

In an embodiment of the present invention the living organisms comprise fish, smolt, crustaceans, shellfish or other organism living in freshwater or sea.

DETAILED DESCRIPTION OF THE INVENTION

The present invention will become more fully understood from the detailed description given hereinafter and the accompanying drawings which are given by way of illustration only, and thus, are not limitative of the present invention, and wherein.

Figure 1:
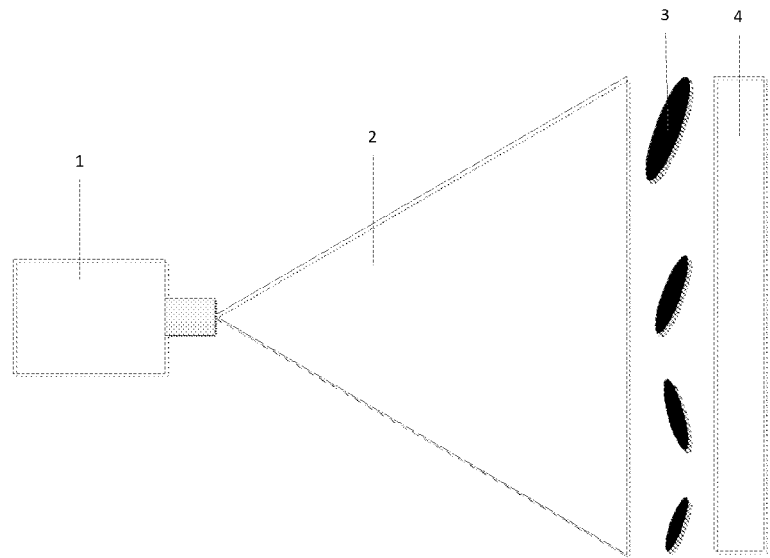
FIG. 1 shows the top-view of a camera registering a stream of objects without the use of the optical device disclosed herein.
Figure 2:
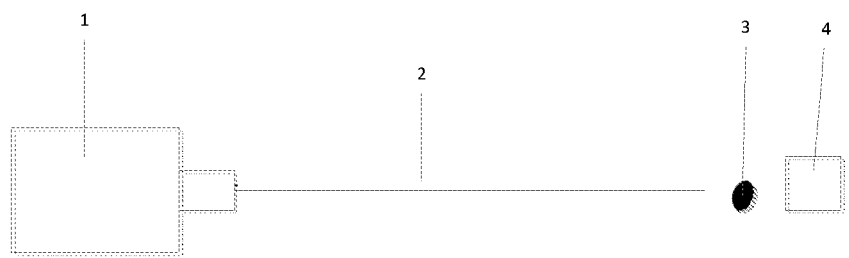
FIG. 2 shows the side-view of a camera registering a stream of object without the optical device disclosed herein.

In FIG. 1 the camera (1) is positioned at a certain distance to cover a given width of the light source (4) which covers the actual width of the channel in which the objects flow perpendicular to the plane of view. This angle of the camera optics and the channel width determines the distance at which the camera needs to be positioned. The triangle (2) represents the field of view of the camera. The objects (3) to be counted flow freely by the light source (4), and create a shadow when they pass the light. This shadow is captured by the camera (1) and is registered. This is also illustrated in FIG. 2 with a side view of the constellation; camera (1), field of view (2), object (3) and the light source (4).

Figure 3:
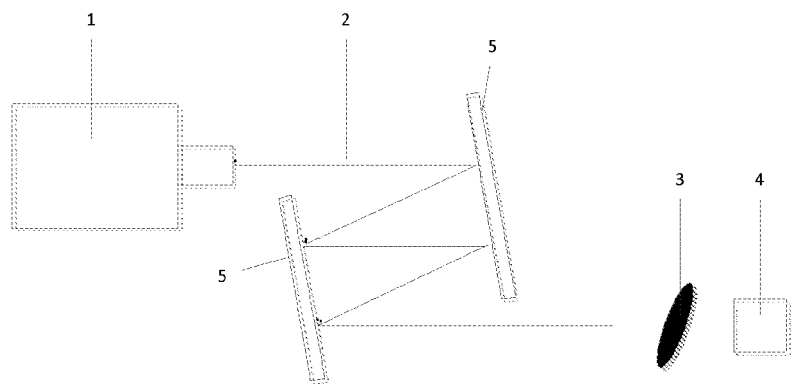
FIG. 3 shows the side-view of a camera with the optical device according to the invention situated between the camera and the objects to be registered.

FIG. 3 shows the side view of the constellation of the new invention. The objects to be counted flow in a vertical direction. A pair of two parallel mirrors (5) are lined up with the camera (1) and the light source (4) in such an angle that a certain number of reflections is achieved and the necessary physical distance between the camera (1) and the light source (4) is reduced considerably still maintaining the field of view of the camera at the channel where the objects (3) flow past the light source (4).

Figure 4:
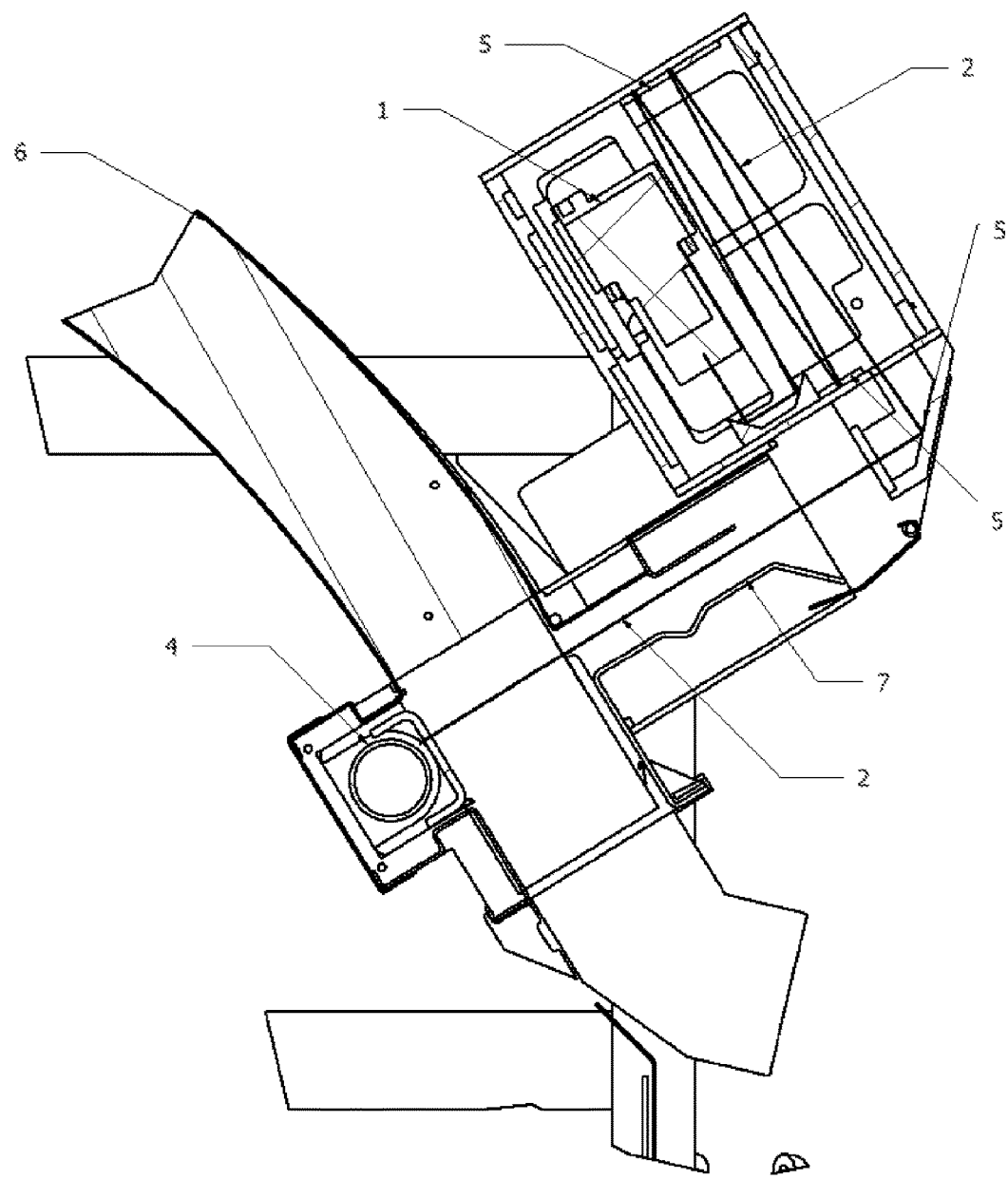
FIG. 4 shows the side-view of a cross section of the optical system according to the invention showing the position of the main components and the line of sight.

In FIG. 4 a side view of a cross section of an actual version of a counter is shown. The objects flow in a closed channel (6) accelerating by the gravity force and pass the light source (4) where the vision field (2) of the camera (1) captures the silhouette of the object. The direction of the field of vision (2) of the camera (1) is redirected by the reflections of the mirrors (5) which are aligned and arranged in a position to minimize the distance of the camera (1) when capturing the whole width of the light source (4). A free opening (7) or gap traverse of the device is necessary to give a free sight for the field of vision (2) of the camera (1).

Figure 5:
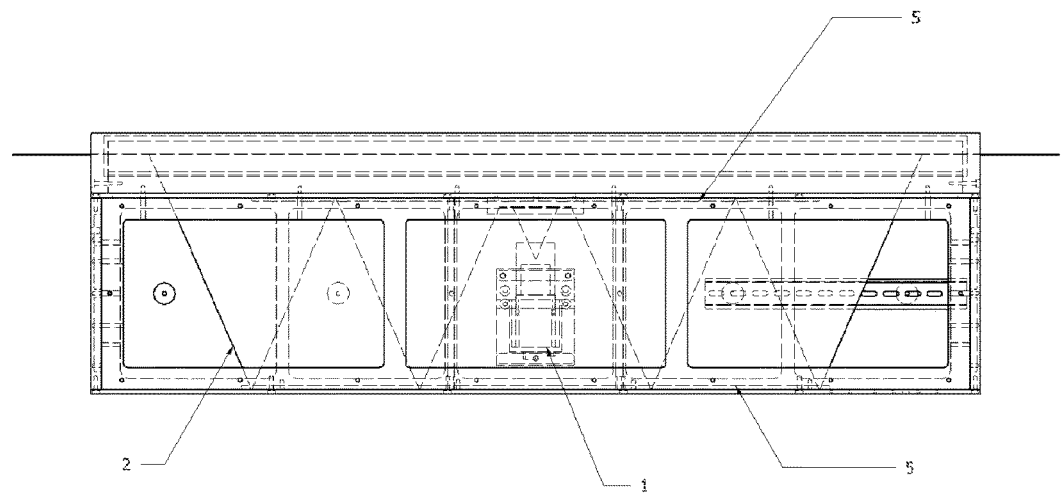
FIG. 5 shows the top-view of the optical device.

FIG. 5 shows a top view of the actual construction of the optical device where the camera (1) is located at the center of the box and the field of vision (2) is represented by the diagonal lines running from the camera (1) to the mirrors (5) forth and back.

Figure 6:
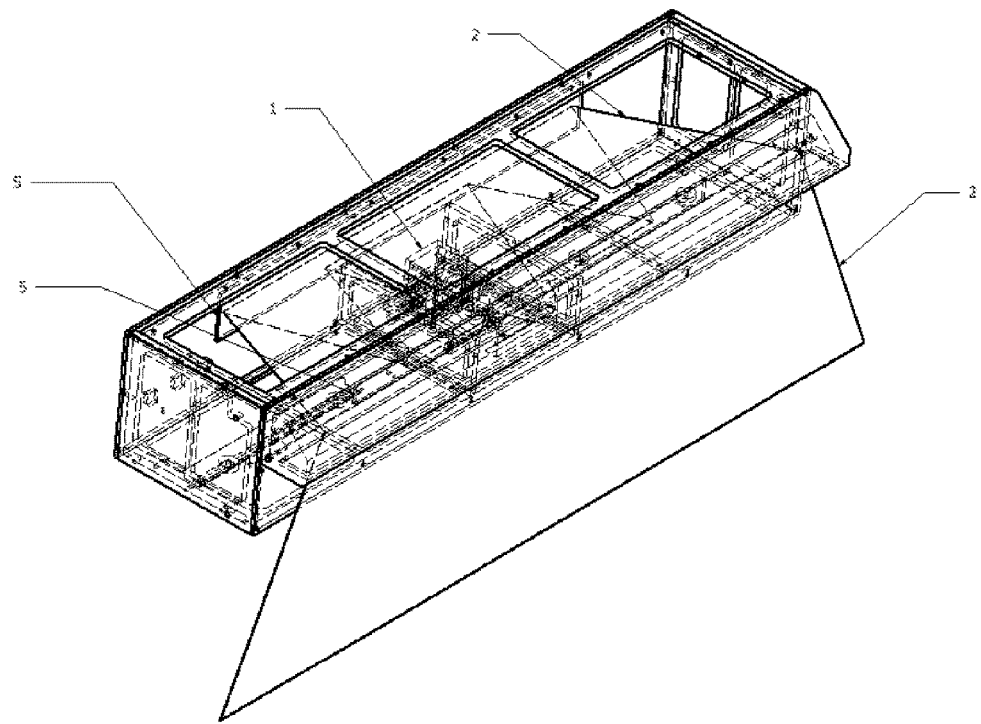
FIG. 6 shows a three-dimensional view of the optical device.

FIG. 6 shows a 3-dimensional view of the actual construction of the optical device as shown in FIG. 5 where the camera (1) is located at the center of the box and the field of vision is shown as (2) and he mirrors as (5).

The invention is not limited to the above described implementations. The invention can be used to count various objects. One embodiment of the invention is to count living organisms such as fish, smolt, crustaceans, shellfish or other organism living in freshwater or sea. Various kinds of mirrors may be used, e.g. first-contact mirrors but other kinds of mirrors can also be used such as regular mirrors. Various kinds of cameras such as frame cameras or other kinds of cameras can be used but one embodiment of the invention is to use a line-scan camera.

The present invention covers further embodiments with any combination of features from different embodiments described above. Reference signs in the claims are provided merely as a clarifying example and shall not be construed as limiting the scope of the claims in any way. The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantial constant" shall also cover exactly constant). The terms "a", "an", "first", "second" etc do not preclude a plurality.

The invention claimed is:

1. An apparatus for determining density or number of living organisms in a flow, the apparatus comprising
   a channel for a flow of living organism, the channel comprising a flattened portion or lane made from transparent material;
   a light source for projecting light through a stream of living organisms, the light source being positioned below the flattened channel or lane;
   an optical device positioned above and directed towards the flattened channel or lane, the optical device being centered between at least two mirrors, which reflect the light from the flattened channel or lane toward the optical device;
   an outlet; and
   a computer,
   wherein the computer determines the density or amount of living organisms based on the amount of light reflected detected by the optical device.

2. The method according to claim 1, wherein the optical device is a camera.

3. The apparatus according to claim 2, wherein the camera is a line-scan camera.

4. The apparatus according to claim 1, wherein the at least two mirrors are first-contact mirrors.

5. The apparatus according to claim 1, wherein the flattened portion or lane of the channel made from transparent material has an open upper surface.

6. The apparatus according to claim 1, wherein the flattened portion or lane of the channel made from transparent material has a broadened lower surface than the remaining part of the channel.

7. The apparatus according to claim 1, wherein one or more of the channel, the light source, the optical device and the outlet are positioned within a housing.

8. The apparatus according to claim 7, wherein the light source or the optical device are positioned within a separate housing below and above the channel, respectively.

9. The apparatus according to claim 1, wherein the living organisms comprise fish, smolt, crustaceans, shellfish or other organism living in freshwater or sea.

10. A fish farm comprising an apparatus for determining a density or number of living organisms in a flow, the apparatus comprising
    a channel for a flow of living organisms, the channel comprising a flattened channel or lane made from transparent material;
    a light source for projecting light through a stream of living organisms, the light source being positioned below the flattened channel or lane;
    an optical device positioned above and directed towards the flattened channel or lane, the optical device being centered between at least two mirrors, which reflect the light from the flattened channel or lane toward the optical device;
    an outlet; and
    a computer,
    wherein the computer determines the amount of living organisms in a flow based on the amount of light reflected detected by the optical device.

11. A method for determining density or number of living organisms in a flow, the method comprising the steps of:
    feeding a flow of living organisms in a channel, the channel comprising a flattened channel or lane made from transparent material;
    projecting light through a stream of living organisms using a light source, the light source being positioned below the flattened channel or lane;
    feeding the flow of living organisms through an outlet;
    directing an optical device towards the flattened channel or lane by positioning the optical device above the flattened channel or lane and centering the optical device between at least two mirrors, which reflect the light from the flattened channel or lane toward the optical device;
    detecting, by the optical device, an amount of light reflected by the mirrors toward the optical device; and
    determining, by a computer, the amount of living organisms in a flow based on the amount of light reflected detected by the optical device.

12. The method according to claim 11, wherein the living organisms comprise fish, smelt, crustaceans, shellfish or other organism living in freshwater or sea.

13. The method according to claim 11, Wherein determining, by a computer, the amount of living organisms in a flow includes recording and counting silhouette images of objects passing by the light source and detected by the optical device.

14. The apparatus according to claim 1, wherein the at least two mirrors include more than two mirrors aligned and arranged so that the optical device captures a whole width of the light source.

15. The apparatus according to claim 1, wherein the at least two mirrors are positioned parallel to each other.

* * * * *